United States Patent
Boice et al.

(10) Patent No.: US 6,895,048 B2
(45) Date of Patent: *May 17, 2005

(54) ADAPTIVE ENCODING OF A SEQUENCE OF STILL FRAMES OR PARTIALLY STILL FRAMES WITHIN MOTION VIDEO

(75) Inventors: Charles E. Boice, Endicott, NY (US); Barbara A. Hall, Endwell, NY (US); Agnes Y. Ngai, Endwell, NY (US); Charles J. Stein, Peckville, PA (US); Everett G. Vail, III, Binghamton, NY (US); Edward F. Westermann, Endicott, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,118

(22) Filed: Mar. 20, 1998

(65) Prior Publication Data

US 2001/0001614 A1 May 24, 2001

(51) Int. Cl.[7] .................................................. H04N 7/12
(52) U.S. Cl. ............. 375/240.02; 375/240; 375/240.01; 375/240.12
(58) Field of Search ........................... 375/240, 240.01, 375/240.02, 240.2, 240.03, 240.12, 240.14, 240.15, 240.27, 240.24; 382/250; 348/405, 415, 419, 420, 421, 700, 701

(56) References Cited

U.S. PATENT DOCUMENTS

| | | |
|---|---|---|
| 5,142,362 A | 8/1992 | Masera et al. ............. 358/133 |
| 5,231,484 A | 7/1993 | Gonzales et al. ........... 358/133 |
| 5,301,242 A | 4/1994 | Gonzales et al. ............. 382/56 |
| 5,321,440 A * | 6/1994 | Yanagihara et al. ...... 375/240.2 |
| 5,426,463 A * | 6/1995 | Reininger et al. ...... 375/240.03 |
| 5,426,512 A | 6/1995 | Watson ........................ 358/426 |
| 5,508,747 A | 4/1996 | Lee ............................. 348/441 |
| 5,513,010 A | 4/1996 | Kori et al. .................. 358/341 |
| 5,532,746 A * | 7/1996 | Chang .................... 375/240.12 |
| 5,563,662 A * | 10/1996 | Kishi ..................... 375/240.24 |

(Continued)

FOREIGN PATENT DOCUMENTS

JP 7 135652 5/1995 ............ H04N/7/30

OTHER PUBLICATIONS

IBM Technical Disclosure Bulletin, vol. 38, No. 09, "Temporal–Based Dithering for Reducing Perceived Quantization Error in Video Displays", Sep. 1995, pp. 61–63.
IBM Technical Disclosure Bulletin, vol. 39, No. 04, "Limited Quantization Scale Selection for Moving Picture Experts Group Encoders", Apr. 1996, p. 11.

*Primary Examiner*—Allen Wong
(74) *Attorney, Agent, or Firm*—William H. Steinberg, Esq.; Kevin P. Radigan, Esq.; Heslin Rothenberg Farley & Mesiti, P.C.

(57) ABSTRACT

Method, system and computer program product are provided for adaptively encoding in hardware, software or a combination thereof a series of still or partially still pictures using motion video encoding. A pre-encode statistics measurement unit is employed to derive statistics on each frame of the sequence of video frames to be encoded. The statistics are determinative of whether the frame comprises a still frame. If so, at least one controllable parameter to be used to encode the still frame is modified, and an encoding engine employs the at least one controllable parameter to encode the still frame so that pulsation artifacts are prevented between still frames of the series of still frames. Partial still picture encoding to prevent pulsation artifacts on a macroblock level is also addressed.

41 Claims, 9 Drawing Sheets

U.S. PATENT DOCUMENTS

| | | | | |
|---|---|---|---|---|
| 5,568,200 A | * | 10/1996 | Pearlstein et al. | 375/240.27 |
| 5,602,594 A | * | 2/1997 | Cho et al. | 375/240.05 |
| 5,608,652 A | | 3/1997 | Astle | 364/514 R |
| 5,675,666 A | | 10/1997 | Komuro et al. | 382/232 |
| 5,691,775 A | | 11/1997 | Astle | 348/416 |
| 5,715,176 A | | 2/1998 | Mobini | 364/514 R |
| 5,751,861 A | * | 5/1998 | Astle | 382/250 |
| 5,825,425 A | * | 10/1998 | Kazui et al. | 375/240.24 |
| 5,835,147 A | * | 11/1998 | Florentin et al. | 375/240.12 |
| 5,847,763 A | * | 12/1998 | Matsumura et al. | 375/240.15 |
| 5,978,029 A | * | 11/1999 | Boice et al. | 375/240.14 |

\* cited by examiner

O LUMINANCE DATA (Lx,y)
X CHROMINANCE DATA (Cb)x,y; (Cr)x,y

*fig. 6A*

O LUMINANCE DATA (Lx,y)
X CHROMINANCE DATA (Cb)x,y; (Cr)x,y

*fig. 6B*

ADAPTIVE ENCODING OF A SEQUENCE OF STILL FRAMES OR PARTIALLY STILL FRAMES WITHIN MOTION VIDEO

TECHNICAL FIELD

This invention relates in general to compression of digital visual images, and more particularly, to a technique for encoding a series of still frames within a moving video sequence using image statistics derived from the video sequence to dynamically change one or more controllable encoding parameter(s) used in encoding the series of still frames.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of a video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and trade-offs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

The MPEG-2 standard is designed for motion video. Many coding tools and options are defined in the standard to achieve high quality pictures at low bit rates. One significant feature of video compression in MPEG-2 is adaptive quantization, meaning that the quantization level is adjustable from one picture to the next and from one macroblock to the next within a picture. This flexibility allows an encoder to balance the output bitstream size and thereby achieve a constant bit rate output. Variation in quantization level also allows each compressed picture to have a different amount of encode bits based on complexity of intra and inter-picture characteristics.

When the input video stream is constant, i.e., one picture appears to be the exact replica of the previous picture and an exact replica of the next picture, this is called a series of still frames. Slight variations in the amount of detail of an encoded and then decoded macroblock of a current frame compared to the same encoded and then decoded macroblock of a prior frame or a next frame in the series of still frames can create fluctuation in luminance and/or chrominance data which can appear as movement between the frames notwithstanding that the frames actually comprise a series of still frames. This appearance of movement is referred to as pulsation artifacts. For instance, variation in chrominance data from a prior frame to a current frame can create differences in shade of the same color. These differences in color shade effectively create pulsation artifacts which can cause a series of still pictures to come alive and no longer resemble the original input video.

This invention thus seeks to enhance picture quality of an encoded video sequence having a series of still frames or partially still frames to enhance the encoding of the frames and prevent pulsation artifacts from, for example, still frame to still frame.

DISCLOSURE OF THE INVENTION

Briefly summarized, the invention comprises in one aspect a method for encoding a sequence of video frames which includes for each frame of the sequence: determining if the frame comprises a still frame; encoding the frame employing at least one controllable parameter; and adapting encoding of the frame if the determining determines that the frame is a still frame, wherein the adapting includes adjusting the at least one controllable parameter employed in encoding the frame to minimize pulsation artifacts between still frames of a series of still frames within the sequence of video frames, and wherein the still frame comprises one still frame of the series of still frames.

In a further aspect, the invention comprises a method for encoding a frame of a sequence of video frames. The frame has a plurality of macroblocks and the method includes for at least some macroblocks of the frame: encoding the macroblock employing at least one controllable parameter; and adapting the encoding of the macroblock when the macroblock is a still macroblock, the adapting including adjusting the at least one controllable parameter employed in encoding the still macroblock to minimize pulsation artifacts between corresponding still macroblocks of adjacent frames in the sequence of video frames.

In another aspect, the invention comprises a system for encoding a sequence of video frames. The system includes a pre-encode processing unit and an encoding engine. The pre-encode processing unit includes a statistics measurement unit for use in determining if a current frame of the sequence of frames comprises a still frame, and a control unit for modifying at least one controllable parameter when the current frame is determined to comprise a still frame. The at least one controllable parameter is used by the encoding engine to encode the current frame of the sequence of video frames.

In still another embodiment, the invention comprises a computer program product having computer usable medium with computer readable program code means therein for use in encoding a sequence of video frames. The computer readable program code means in the computer program product includes computer readable program code means for causing a computer to affect for each frame of the sequence of video frames: determining if the frame comprises a still frame; encoding the frame employing at least one controllable encode parameter; and adapting the encoding of the frame if the frame is determined to be a still frame, the adapting including adjusting the at least one controllable parameter employed in encoding the still frame to prevent pulsation artifacts between still frames of a sequence of still frames within the sequence of video frames, wherein the still frame comprises one still frame of the sequence of still frames.

In general, encoding in accordance with the principles of the present invention minimizes or even eliminates perceptible picture pulsation in a sequence of MPEG encoded still frames or partial still frames. The encoding technique of this invention can ensure constant picture quality for a series of still pictures and partially still pictures. Further, bits used in encoding a still picture or partially still picture are conserved by encouraging the use of skip macroblocks during the encode process. Adaptive encoding in accordance with this invention is performed by a pre-encode statistics gathering process and includes programmable still picture detection features.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 6a & 6b illustrate positioning of luminance and chrominance signals in 4:2:2 frame format and 4:2:0 frame format, respectively.

FIGS. 7a & 7b illustrate movement of an object 380 for which a framewide summation statistic in accordance with this invention would erroneously indicate that the frame 370' of FIG. 7b is a still frame, while use of a multi-region (372) statistical analysis correctly signals frame 370' of FIG. 7b to contain motion relative to frame 370 of FIG. 7a.

BEST MODE FOR CARRYING OUT THE INVENTION

Figure 1:
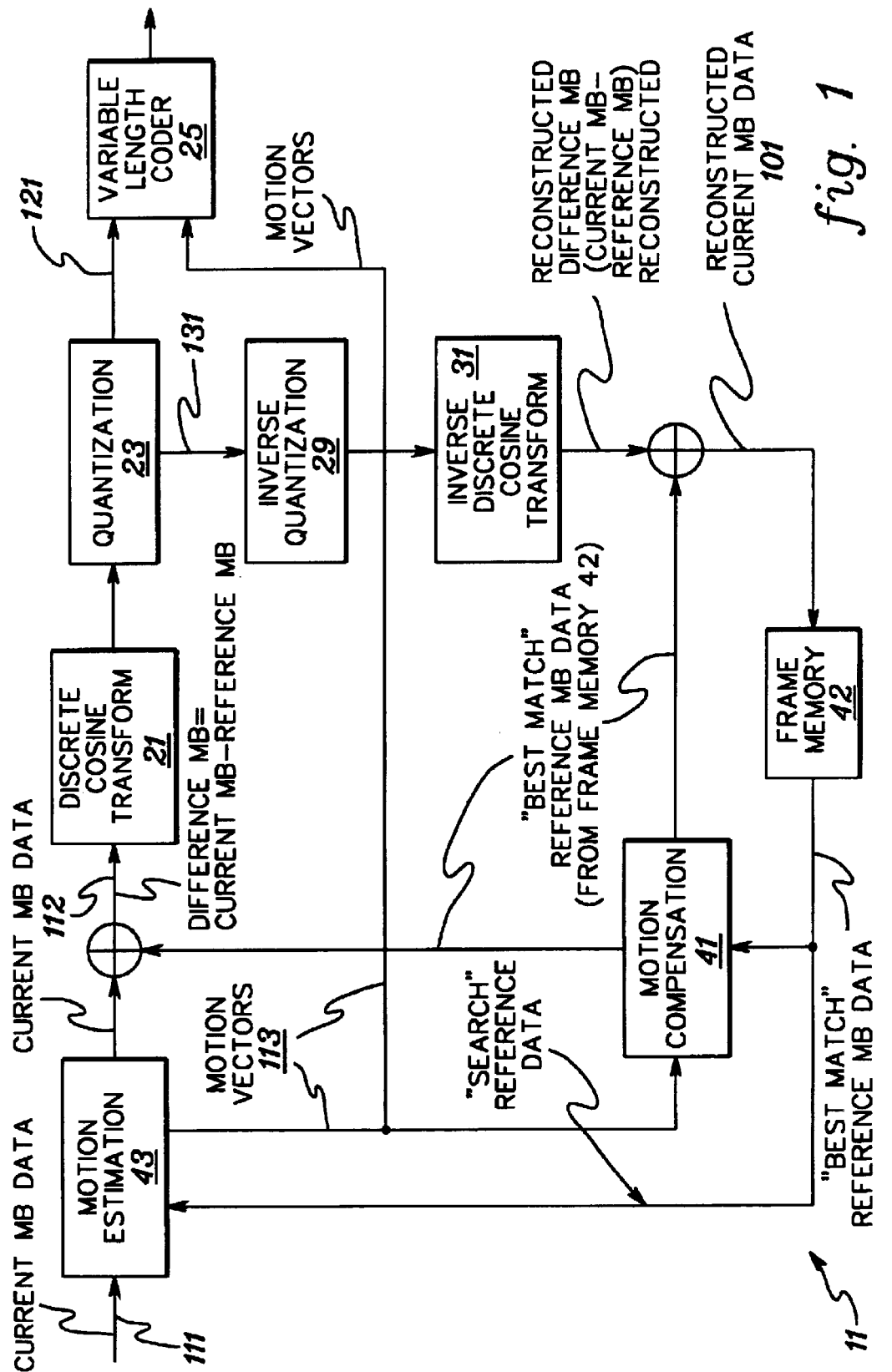
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
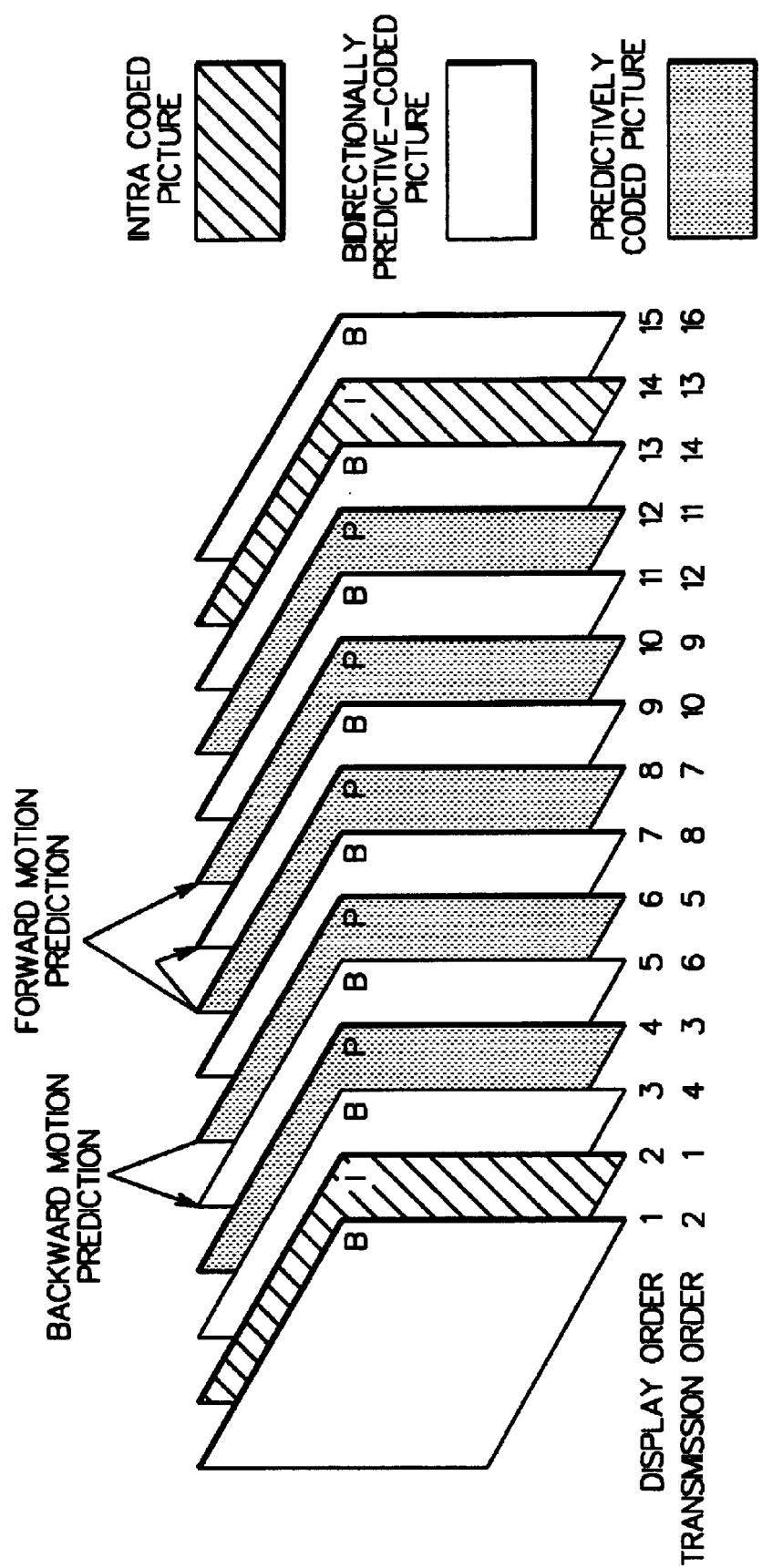
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
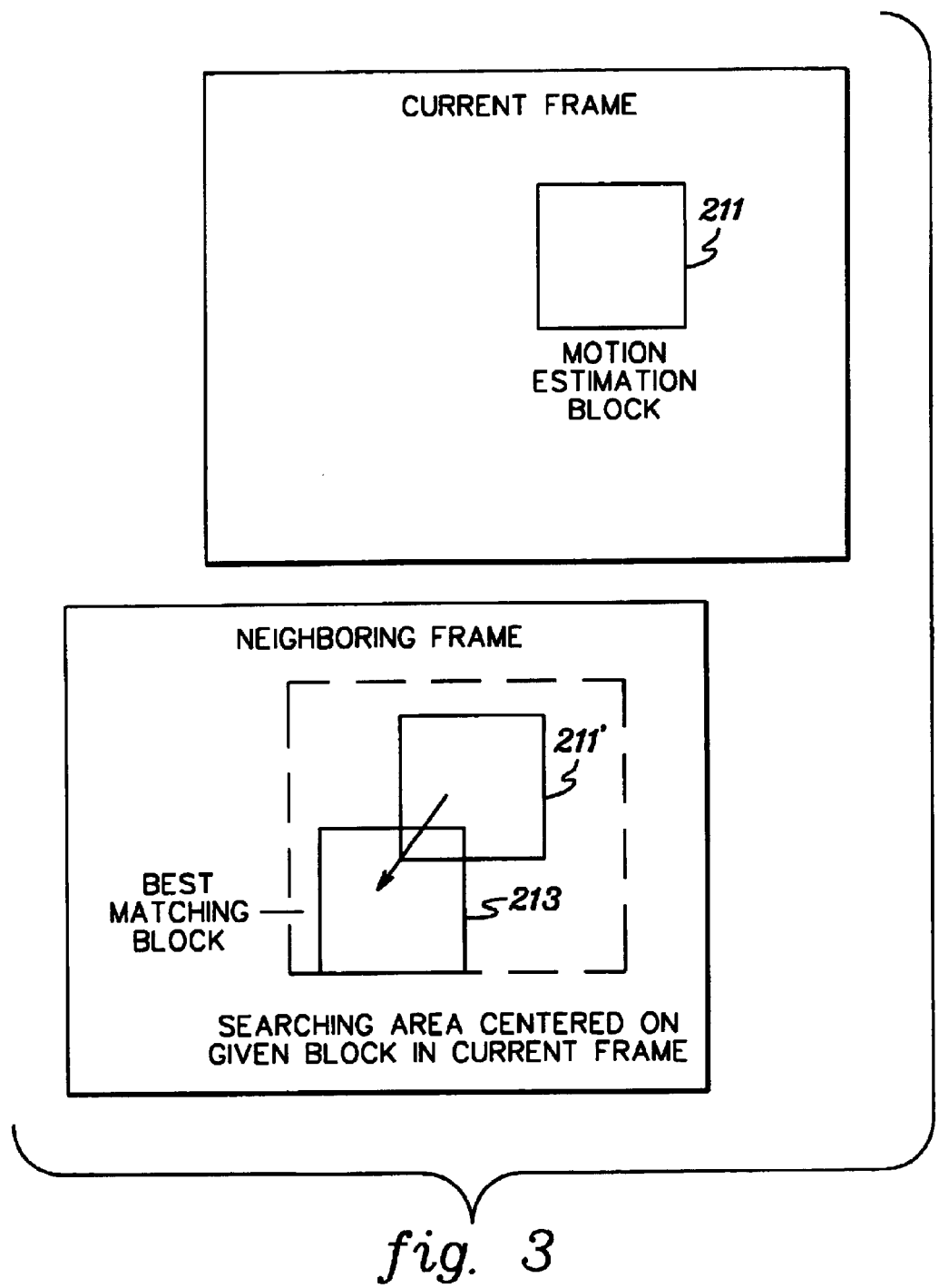
FIG. 3 illustrates the search from the motion estimation block in the current frame or picture to the best matching block in a subsequent or previous frame or picture. Elements 211 and 211' represent the same location in both pictures.
Figure 4:
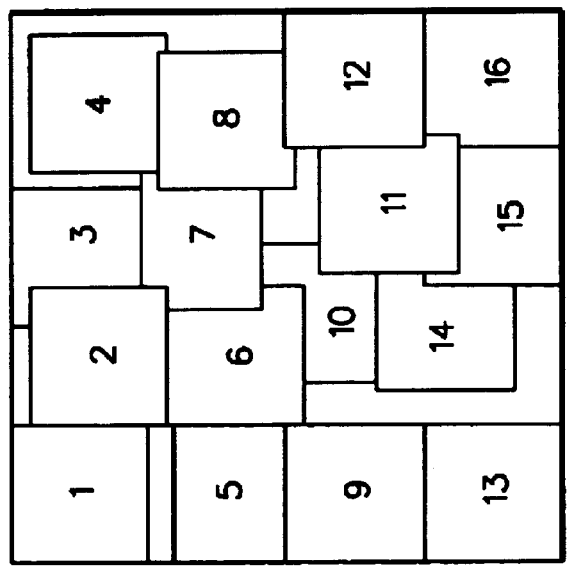
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^1$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, encoder performance and picture quality are often enhanced today through the use of adaptive quantization. Examples of adaptive quantization are presented in co-pending, commonly assigned U.S. patent applications by Boroczky et al., entitled "Adaptive Real-Time Encoding of Video Sequence Employing Image Statistics," filed Oct. 10, 1997, Ser. No. 08/948,442, and by Boice et al., entitled "Real-Time Variable Bit Rate Encoding of Video Sequence Employing Image Statistics," filed Jan. 16, 1998, Ser. No. 09/008,282, both of which are hereby incorporated herein by reference in their entirety.

Adaptive quantization can be used to control the amount of data generated so that an average amount of data is output by the encoder and so that this average will match a specified bit rate, thereby achieving an overall constant bit rate. Since this compression has adaptive capabilities, there is a possibility that macroblocks in a still frame can change slightly from corresponding macroblocks in a prior or reference still frame. This is partially due to the type of motion estimation employed. For example, hierarchical motion estimation is often used for MPEG encoding in order to save circuitry, enhance performance and reduce memory bandwidth. Hierarchical motion estimation, however, does not rely on a full motion estimation search pixel by pixel. Rather, a scaled down picture size is employed by grouping pixels together (for example, four pixels) into a single modified pixel value, which results in loss of accuracy when motion estimation is performed. This inaccuracy can create small errors, which in the case of motion video is acceptable because the difference data (i.e., the prediction error) is forwarded to the decoder for use in recreating the original picture. However, in the case of still pictures, these inaccuracies are manifested as pulsation artifacts due to differences in shading and color between adjacent still frames, which cause what should appear to be a still picture to appear to be moving.

Based on this observation, applicants have conceived of the present invention to enhance MPEG encoding of a still or partially still picture sequence and minimize or even eliminate pulsation artifacts between frames in a sequence of still video.

Two considerations are important to preventing pulsation between still pictures. One requirement is that the same coding type be employed from still picture to still picture, and the second is that a comparable level of quantization be maintained for the same macroblock from still picture to still picture. However, these coding options can only be applied when a picture is first determined to be a still picture.

When successive frames of a sequence of still frames are the same, both the luminance and chrominance data (or intensity) of each pair of still pictures in the sequence should be the same, with the exception of a small amount of noise. In addition, variance of the value of the same pixel across two adjacent still pictures should be zero, or a small value if noise is present. This information is used in accordance with the present invention to accumulate in a picture preprocessing stage image statistics to determine whether the current picture is a still picture within a sequence of still pictures.

Figure 5:
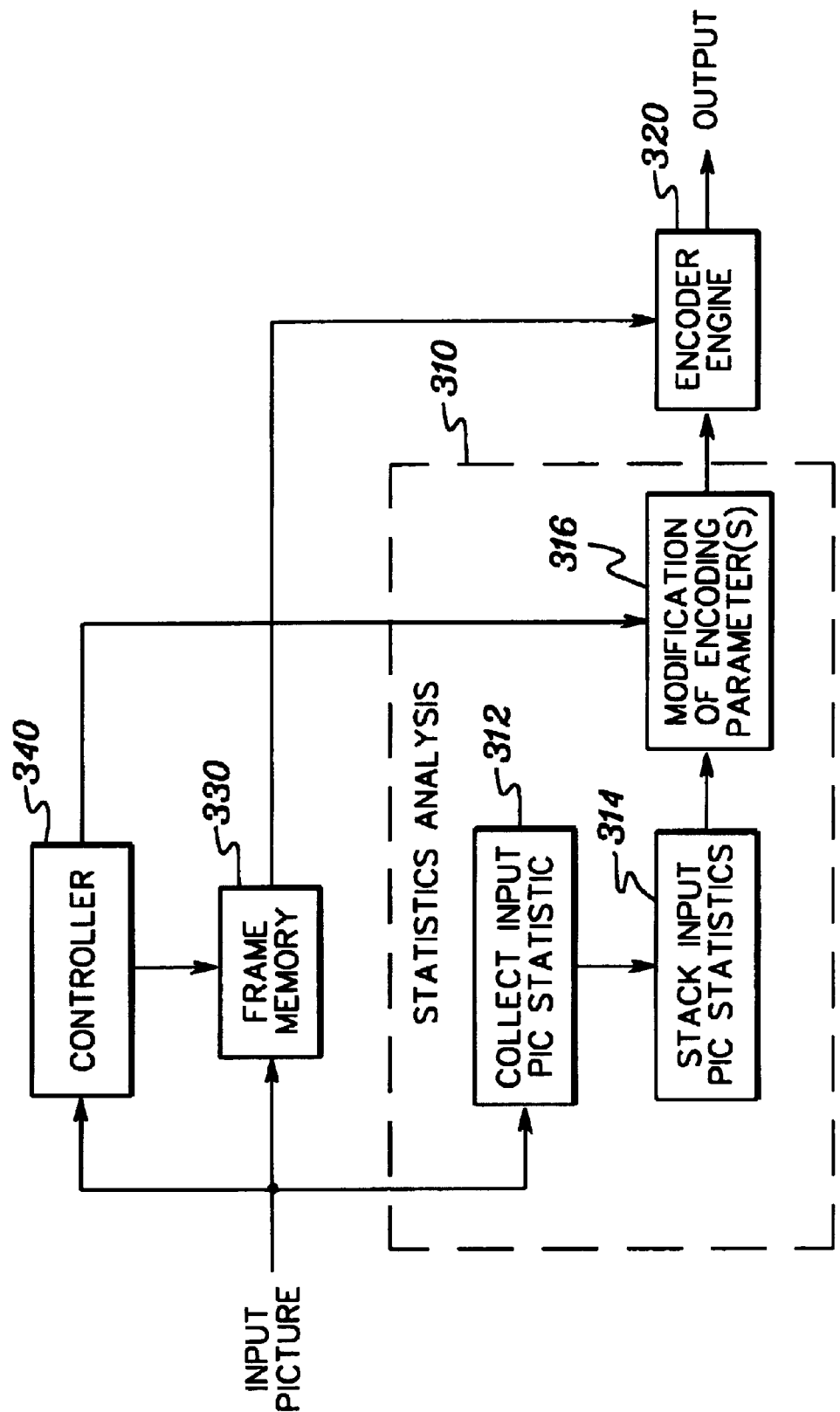
FIG. 5 shows a generalized encode system 300 in accordance with the present invention. System 300 includes pre-encode statistics analysis 310 to determine whether an input picture comprises a still picture and based thereon whether one or more encoding parameters should be varied for the picture. Modified encoding parameters are forwarded to the encode engine 320 for use in encoding the input picture, thereby allowing adaptive encoding of a series of still frames within a sequence of motion video frames.

FIG. 5 depicts one embodiment of an encode system, generally denoted 300, in accordance with this invention. System 300 includes a pre-encode stage 310 where statistics gathering and analysis are performed on each frame of a sequence of motion video frames to determine whether the current frame is a still frame relative to the preceding frame of the sequence. As shown, an input sequence of video frames is buffered in frame memory 330, while preprocessing of the input stream by statistics gathering and analysis 310 is performed. Controller 340 determines where a given input picture should be placed within frame memory 330, as well as when to encode the picture.

Preprocessing 310 gathers statistics indicative of whether the current picture comprises a still picture 312 and places them into a buffer 314. Stacking of input picture statistics is needed because the GOP structure employed in MPEG encoding of a sequence of video frames may have to be reordered prior to encoding. Pursuant to controller 340 microcode, when a given frame is to be encoded preprocessing 310 determines whether one or more encoding parameters should be adjusted 316 for the frame based on whether the current frame comprises a still frame. As described further below, adjustable parameters may include a motion vector mode setting, a macroblock quantization level, and a target bitrate for encoding the frame. This information is forwarded to the encoder engine 320 commensurate with retrieval of the input data to be compressed from frame memory 330. Unless otherwise stated herein, encode engine 320 can comprise conventional MPEG compression processing as summarized initially herein.

By way of example, statistics analysis 310 determines whether the current frame is stationary, i.e., comprises a still frame, by determining for example a summation of all pixel data in the current frame, which is referred to herein as a PIX-SUM, and by determining an accumulated absolute value of a difference in pixel data between adjacent pixels in the current frame. This comparison is referred to as a "PIX-DIFF".

FIGS. 6a & 6b represent positioning of luminance and chrominance samples for 4:2:2 and 4:2:0 picture data, respectively. As noted, two statistics are preferably gathered in accordance with this invention, namely, PIX-SUM and PIX-DIFF. The equations for PIX-SUM can vary with the data format, while the equation for PIX-DIFF is the same for both formats. For a 4:2:2 picture format, an equation for PIX-SUM is:

$$PIX - SUM = 2\sum_{x=1}^{Max}\sum_{y=1}^{Max} L_{x,y} + \sum_{x=1}^{Max}\sum_{y=1,3,5...}^{Max} Cb_{x,y} + \sum_{x=1}^{Max}\sum_{y=1,3,5...}^{Max} Cr_{x,y}$$

Where: x is the row number from 1 to the maximum number of lines in the picture (e.g., 480); and
  y is the column number from 1 to the maximum number of columns in the picture (e.g., 720).

PIX-DIFF is determined by imagining the luminance data lines of the picture concatenated to form a long line of luminance samples. Then for a given picture, the equation for PIX-DIFF statistics is:

$$PIX - DIFF = \sum_{y=1,3,5...}^{Max} |L_y - L_{y+1}|$$

The PIX-DIFF statistic essentially comprises finding the difference between two adjacent luminance pixels in this concatenated string of luminance data for the frame and then summing the absolute values of those differences. As an alternative, PIX-DIFF could be defined as an accumulation of both luminance and chrominance data for the current frame, or an accumulation of chrominance data only.

For a 4:2:0 formatted picture, the PIX-SUM equation would be:

$$PIX - SUM = 4\sum_{x=1}^{Max}\left(\sum_{y=1}^{Max}(L_{x,y})\right) +$$

$$\sum_{x=1,5,3,5...}^{Max}\left(\sum_{y=1,3,5...}^{Max}(Cb_{x,y})\right) + \sum_{x=1,5,3,5...}^{Max}\left(\sum_{y=1,3,5...}^{Max}(Cr_{x,y})\right)$$

Where x & y are as defined above in connection with the 4:2:2 formatted picture.

Figure 7A:
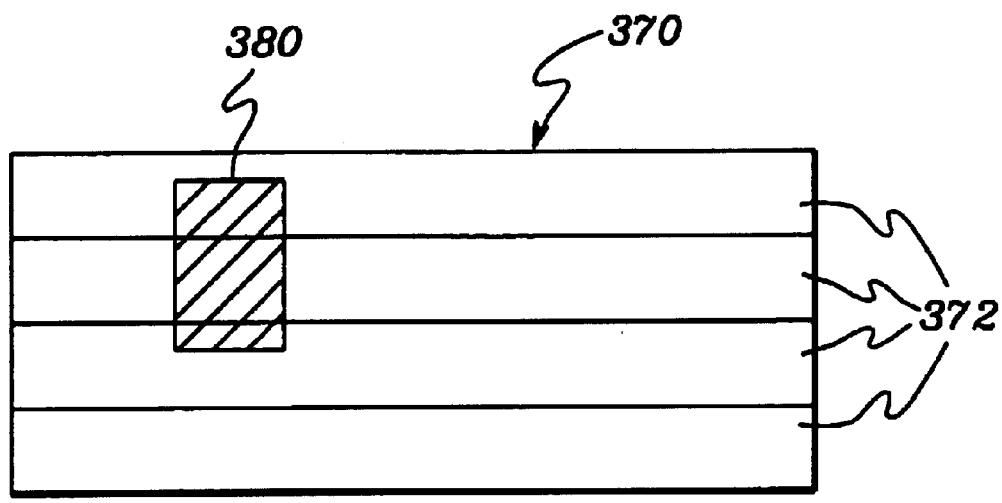
Figure 7B:
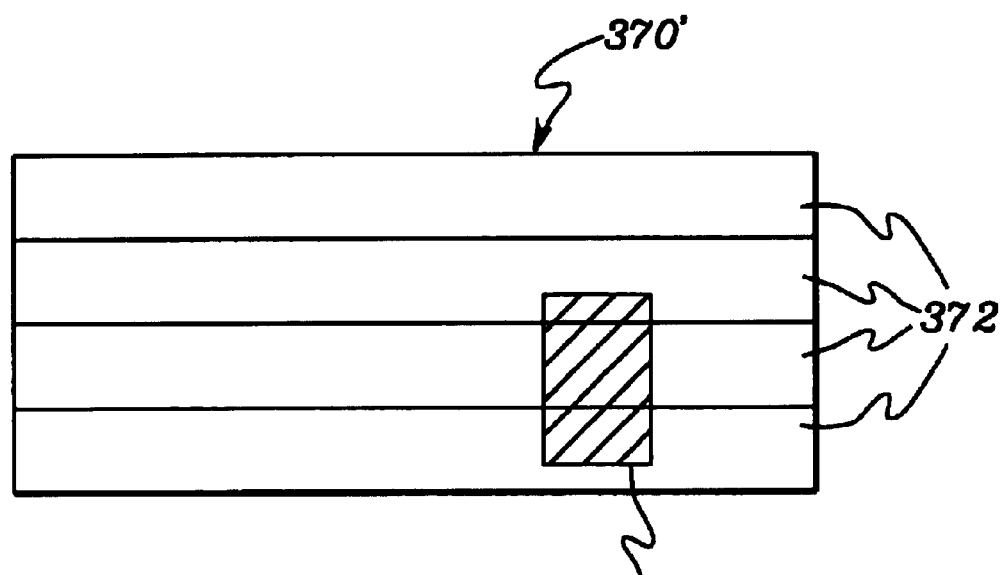

In a sequence of frames where frame 1 is followed by frame 2, the PIX-SUM of frame 1 can equal the PIX-SUM of frame 2 without the content of the pictures being stationary. This is depicted in FIGS. 7a & 7b where a first frame 370 has an object 380 therein and a uniform or blank background. In FIG. 7b, the second frame 370' has the same uniform background, however object 380 has moved within the frame. If statistically analyzed on a frame basis, the object within the frame will be identical and its movement will have been lost. Thus, it is preferable to employ multiple regions, such as rows or stripes 372, to improve accuracy of the PIX-SUM statistic as a means of detecting a still frame. By dividing the frame into different regions, and requiring that the PIX-SUMs of each region of adjacent pictures be within a predefined limit, the PIX-SUM statistic can better ensure the absence of motion from picture 1 to picture 2. Note that four stripes 372 are depicted in FIGS. 7a & 7b by way of example only. Any number of regions "1" could be employed between 1 (i.e., the entire picture) and n, where n is the number of pixels in each picture. In the embodiment presented herein, a picture is deemed still if the PIX-SUM for the four stripes in adjacent pictures are equal or within a predefined threshold X, and the PIX-DIFF for the adjacent frames is also within a predefined threshold Y. By way of example, an experimentally determined value of 256 can be employed for both X and Y above.

Any number of regions can be employed within the frames. These regions can be horizontal bands, vertical bands, or regions of varying shape, etc. The pixel values accumulated in one band are referred to as "$PIX\text{-}SUM_{k,l}$", wherein "k" is the current picture and "l" is the band, e.g., 1 to 4 as depicted in FIGS. 7a & 7b. This invention thus determines whether the current frame is stationary by looking at the PIX-SUM for each region and comparing the differences in these sums to an empirically determined acceptable noise level. If they are all within the predefined bound, then the frame is considered stationary. A picture is thus statistically a still picture if:

$$\Sigma(PIX\text{-}SUM_{k,l} - PIX\text{-}SUM_{(k-1),l}) < X$$

Where: k=picture number.
l=the region of the picture; i.e., 1–4 for the four bands of FIGS. 7a, 7b.
X=an experimentally determined number looking at different types of still pictures. As one example, the number may comprise 256.

Additionally, identifying the current frame as a still frame requires:

$$\Sigma(|PIX\text{-}DIFF_k - PIX\text{-}DIFF_{k+1}|) < Y$$

Wherein Y is an experimentally predetermined value representative of how much noise can be tolerated and still identify the current frame as a still picture. The value relates to picture size and for a conventional 720×480 pixel picture may be 256.

Once the current frame is statistically determined to comprise a still frame, selected encoding parameters are modified for use in compressing the still picture. For example, a zero motion vector mode is set ON restricting the motion vector search range to the macroblock size for the still picture. This means each macroblock is only compared to the corresponding macroblock in the reference still picture. The accumulated difference for the macroblock comparisons is the "prediction error" quantized prior to variable length coding to form the bitstream. The only way to maintain the same macroblock coding type is to match the macroblock perfectly with the reference picture's corresponding macroblock. A perfect match allows the macroblock to be coded as a "skip" macroblock. When two macroblocks are identical, the prediction error is zero. However, the prediction error may contain a small value in the presence of noise. The macroblocks are thus considered identical when the prediction error is within a predefined threshold obtained from experiments. By way of example, in the flowchart embodiment of FIG. 8 (described below) a value of 128 is used. Thus, if the macroblock difference (MBD) is less than this predefined value, the prediction error for the macroblock is made zero.

Preferably, a fixed, minimum macroblock quantization level is used to maintain similar levels of still picture quantization. Picture quality is directly related to the level of quantization, which in turn, is related to the picture complexity and the amount of bits allocated to compress the picture. When all pictures match perfectly to a reference (I) still picture, subsequent picture quality will only be as good as the reference picture. The quality of this reference picture thus controls the quality of the remaining pictures in a sequence of still frames. (When a picture matches perfectly to a reference picture, most macroblocks of that picture will become skip macroblocks pursuant to this invention and only header bits will be needed to code the still picture.)

For this reason, when two adjacent pictures are initially detected as comprising still pictures, a percentage of the bits normally allocated to the second, non-reference picture is preferably reallocated to the first, reference (I) picture. This allows the reference still picture quality to be increased. By way of example, fifty percent of the encode bits for a still frame following a reference still frame for a sequence of still frames are preferably reallocated to the reference picture in accordance with this invention. This is possible because the statistics analysis of the frames described herein comprises pre-encode processing, meaning that this information will be available prior to encoding of the initial reference (I) still picture.

In addition, the average quantization level of the reference picture is preferably used as a minimum quantization level for the remaining pictures in a sequence of still frames. Although a perfect match is expected between two still frames in a sequence, random noise makes the number of skip macroblocks in the picture unpredictable. To use an inaccurate quantization level to produce a constant bit rate stream is risky. An adjustable yet stable quantization level is desired, and it will allow unused bits of one macroblock to be used in another where a perfect match is not found. A stable quantization level can be used by both skip and non-skip macroblocks. A minimum quantization scheme is preferred to avoid overusage of bits, and encoded macroblocks with underproduced bits are preferably filled by padding bits as described below.

The reference macroblock data is used to display all skip macroblocks. A successful still picture detection means the reference picture is used to display all still pictures. In other words, the reference picture is simply displayed again and again, thereby producing the desired stationary image.

Although the MPEG-2 standard is designed for motion video, the scheme described above allows a sequence of still frames within motion video to be compressed using the MPEG-2 standard while still minimizing or preventing perceptible pulsation artifacts when the still pictures are subsequently decompressed and displayed.

Figure 8:
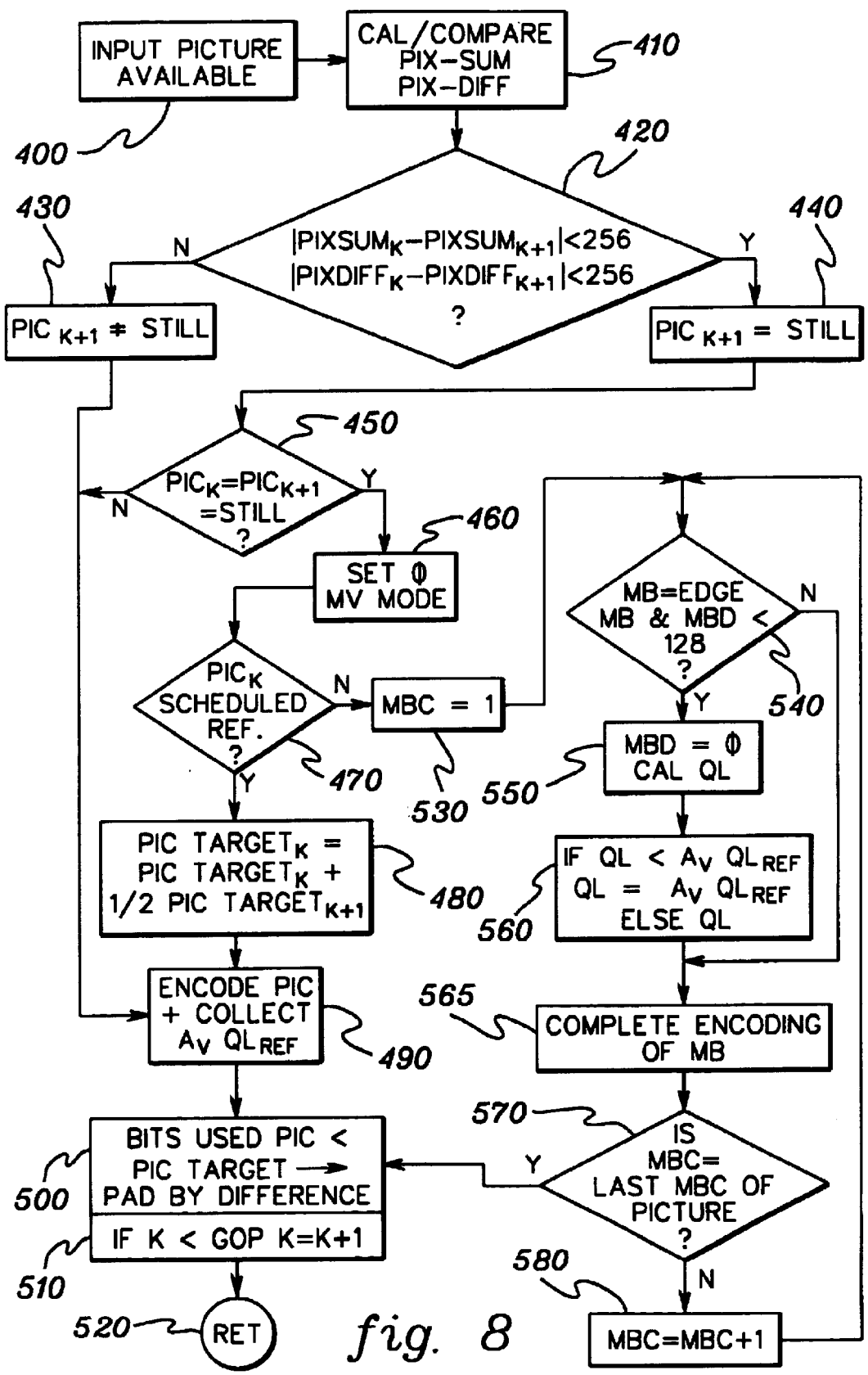
FIG. 8 is a flow diagram of one embodiment for adaptive encoding of a still frame in accordance with the principles of the present invention.

FIG. 8 depicts one embodiment of picture preprocessing and encoding in accordance with the principles of the present invention. Upon detection that an input picture is available 400, the pre-encode statistics gathering process calculates the PIX-SUM and PIX-DIFF values for a current picture k+1. The PIX-SUM between the current picture $PIX\text{-}SUM_{k+1}$ and the previous picture $PIX\text{-}SUM_k$ is examined and the absolute value is determined 410. The PIX-DIFF for the current picture ($PIX\text{-}DIFF_{k+1}$) as well as the $PIX\text{-}DIFF_k$ for the just prior picture are also determined and their absolute difference is obtained. If summations of these absolute differences are each less than a respective predefined value, then a still picture is identified 420. The empirically measured, predefined value for each comparison in the example of FIG. 8 is 256. Should either comparison be untrue, then the current picture contains motion 430 and conventional video encoding of the previous picture ($PIC_k$), for example, pursuant to MPEG standard, is performed. However, if both inequalities 420 are true, then the current picture comprises a still picture and a still picture flag is set for the current picture ($PIC_{k+1}$) 440.

Processing next determines whether the current picture $PIC_{k+1}$ and the prior picture $PIC_k$ both comprise still pictures in accordance with each picture's PIX-SUM and PIX-DIFF values 450. If only current picture $PIC_{k+1}$ is determined to be a still picture, then encoding parameters for the previous picture $PIC_k$ will remain unchanged, and conventional video encoding of the picture is to be performed. However, current picture $PIC_{k+1}$ may subsequently be determined to comprise a beginning reference (I) still picture for a sequence of still frames and have one or more parameters modified in accordance with that determination.

Once it is determined that both the current picture and the prior picture comprise still pictures, then encoding parameters for the current picture $PIC_{k+1}$, and the prior picture $PIC_k$ (i.e., assuming that it comprises the reference picture for the sequence of still frames), will be modified in accordance with this invention. First, the motion vector mode for the current picture is set to zero 460 to limit the macroblock search window and determination is made whether the prior picture $PIC_k$ comprises a reference (I) still picture 470. Assuming that the prior picture $PIC_k$ is the reference still picture, then the target bit rate for the prior reference still picture $PIC_k$ is modified. Specifically, "the target bit rate for $PIC_k$" (herein "$Pic\_target_k$") is redefined as:

$$Pic\_target_k = Pic\_target_k + \frac{1}{2} Pic\_target_{k+1}$$

Moving fifty percent of the current target bit rate to the prior picture $PIC_k$ is presented herein by way of example only. Those skilled in the art will recognize that more or less bits may be moved to the reference still picture $PIC_k$ from the next subsequent still picture $PIC_{k+1}$. The concept again is to increase the target bits for the reference still picture in order to enhance encoding of the reference picture since this picture is subsequently used in the sequence of still pictures, thereby improving quality of all still pictures displayed in the sequence. In accordance with this invention, bits in still pictures subsequent to the reference still picture will often go unused, except for those necessary to code the header data.

The prior reference picture $PIC_k$ is then encoded using the modified picture target rate, and an average quantization level for the reference picture (Av $QL_{ref}$) is collected 490.

Assuming that the current picture $PIC_{k+1}$ is a still picture other than a reference still picture, then the zero motion vector mode is again set ON 460. This means that the motion vector search window will be exactly the size of the given macroblock, and in the same position as the corresponding macroblock in the prior picture. A macroblock count is then set to "1" 530 to initiate encoding of the frame. A determination is made whether this macroblock comprises an edge macroblock in the frame 540. If the macroblock is an edge macroblock, then MPEG standard requires conventional encoding of the macroblock. If the macroblock is other than an edge macroblock, then the comparison between corresponding macroblocks of adjacent still pictures is made to derive macroblock difference (MBD) data (i.e., the prediction error data for the macroblock). As noted above, this MBD is compared against a predefined value, for example, 128 to determine whether this macroblock contains motion. In this example, a value less than 128 is indicative merely of noise and therefore the MBD is zeroed out (MBD=0) 550. If MBD is zero, then the current macroblock is identical to the corresponding macroblock in the reference picture and the current macroblock can be encoded as a skip macroblock.

When a macroblock comprises a skip macroblock, basically there is no data being encoded. Thus, if adaptive quantization is employed, a very low quantization level (QL) results which may be significantly different from the quantization level used in the reference still picture. This difference in quantization level between corresponding macroblocks in a reference still picture and subsequent still picture may appear after compression and decompression as a difference, for example, in color shade which can result in the appearance of movement between still pictures in the sequence. This movement is referred to herein as "pulsation artifacts".

Thus, in accordance with the present invention, after determining that a macroblock is a skip macroblock, the average quantization level for the reference picture in the still sequence is used in place of the quantization level otherwise calculated for the skip macroblock. Thus, if QL<Av $QL_{ref}$, then set QL=Av $QL_{ref}$, otherwise use the quantization level (QL) determined for the macroblock 560 to code that macroblock when completing encoding of the macroblock 565. Processing then determines whether this macroblock is the last macroblock of the picture by checking the macroblock counter 570, and if not, the counter is incremented and return is made to determine whether the next macroblock is an edge macroblock 540.

After encoding a still picture in accordance with the process of FIG. 8, the number of bits used to encode that picture is compared to the target bits for the picture 500. If there are a number of skip macroblocks in the still picture, there will be a number of unused bits left over following encoding of the picture. To avoid varying the quantization level or the amount of data in the next picture, the encoded picture is preferably padded out with zeros by an amount equal to the number of unused bits. This ensures there will be no bits left over to roll to the next still picture. After encoding, including padding out any unused bits, the current picture k+1 and prior picture k are incremented assuming that the current picture is not the last picture in a defined group of pictures (GOP) 510. Thereafter, return is made to encode the next picture 520. Based upon the above, those skilled in the art will note that preprocessing and encoding in accordance with this invention results in enhanced display of a reference still picture and its following still pictures to produce the desired stationary picture using moving picture compression/decompression.

In an alternate aspect, the invention presents a process for encoding a partially still picture. For example, a partial still picture may be a picture with a stationary background and motion in the foreground. In this case, motion estimation is biased to the current macroblock position. The macroblocks corresponding to the stationary background would produce the smallest prediction error. However, this prediction error may not be zero due to the presence of noise. Thus, a threshold value is obtained from experiments, and is used to filter out any unwanted noise when the prediction error is obtained from a zero motion vector. The prediction error is made zero if it is within this threshold. In one implementation, a value of 64 can be used.

To restate, in accordance with this aspect of the invention if there is a partially still picture, then for every macroblock of the picture, the motion vectors are evaluated to determine whether there is a difference between the current picture and the previous picture. If the difference data is small, then the difference is written off as noise and the macroblock difference (MBD) or prediction error is made zero. In this case, the macroblock is assigned the reference quantization level of the last reference, partially still picture, thereby making stationary that portion of the current picture since the average quantization level of the reference picture is used as a minimum quantization level for corresponding macroblocks. This scheme thus produces stable backgrounds in partially still pictures by maintaining the macroblock coding type and the macroblock quantization level.

Figure 9:
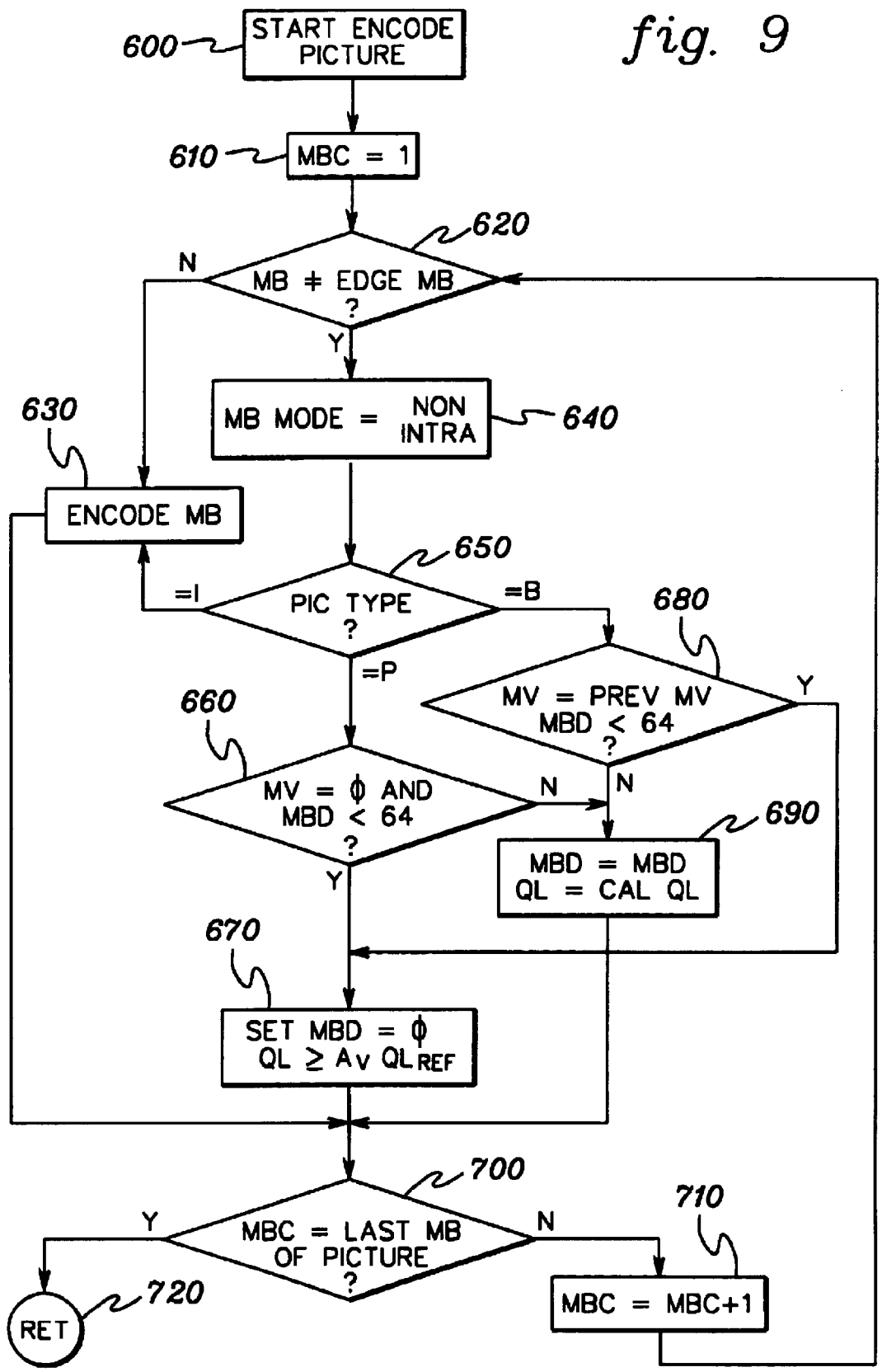
FIG. 9 is a flowchart of one embodiment for adaptively encoding a partially still frame in accordance with the principles of the present invention.

FIG. 9 depicts one embodiment for processing a non-still picture with potentially one or more still macroblocks. Encoding begins 600 by setting a macroblock counter to "1" 610 and determining whether the current macroblock is an edge macroblock of the picture 620. When the macroblock is an edge macroblock, MPEG standard does not allow the macroblock to be defined as a skip macroblock and conventional macroblock encoding is performed 630. However, if the current macroblock is other than an edge macroblock, motion estimation is performed on the macroblock to determine a predictive error and thereby determine whether the macroblock comprises an intra macroblock or a non-intra macroblock. Assuming that the macroblock is a non-intra macroblock 640, the picture type determines the specific coding change. If the picture is an I picture, conventional encoding of the macroblock is performed 630. However, if the picture type is either P or B, then the macroblock coding type and the macroblock quantization level can potentially be modified in accordance with this aspect of the present invention.

For a P type picture, processing determines whether the motion vector in the motion estimation result is zero, and whether the prediction error or macroblock difference (MBD) is less than a predefined threshold. This predefined threshold can again be experimentally determined, and in the example of FIG. 9, comprises 64. If both of these conditions are met, then the macroblock difference is set to zero making the macroblock a skip macroblock and the quantization level for the macroblock is set to the average quantization level for the reference picture in the GOP. Thereafter, processing determines whether the current macroblock comprises the last macroblock of the picture. If not, the macroblock counter is incremented 710 to initiate processing of the next macroblock, otherwise return is made to process a next picture 720.

Assuming that the current picture type 650 is B, then processing next inquires whether the motion vector in the motion estimation result is equal to the motion vector of the previous macroblock of the same picture and whether the macroblock difference is less than a predefined threshold 680. In this example, the predefined threshold is again assigned a value of 64, which can be varied as desired based upon experimentation. If both conditions are met, then the macroblock is again defined as a skip macroblock and the quantization level for the macroblock is set to the average quantization level for the reference frame 670. If the requirements of either inquiry 660 or 680 are unmet, then the macroblock difference value remains the determined macroblock difference value and a quantization level is calculated as conventionally done for MPEG encoding 690. The resulting MBD and quantization level values are employed in encoding the current macroblock. Subsequently, processing inquires whether the current macroblock is the last macroblock of the picture 700, and proceeds therefrom as described above.

From the above discussion, those skilled in the art will note that encoding in accordance with the principles of the present invention minimizes or even eliminates perceptible picture pulsation in a sequence of MPEG encoded still frames or partially still frames. The encoding technique of this invention can ensure constant picture quality for a series of still pictures and/or partially still pictures. Further, bits used in encoding a still picture or partially still picture are conserved by encouraging the use of skip macroblocks during the encode process. Adaptive encoding in accordance with this invention is performed by a pre-encode statistics gathering process and includes programmable still picture detection features.

The present invention can be included, for example, in an article of manufacture (e.g., one or more computer program products) having, for instance, computer usable media. This media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for encoding a sequence of video frames comprising for each frame of the sequence of video frames:
   (a) encoding said frame employing at least one controllable parameter; and
   (b) adapting said encoding (a) of said frame when said frame is a still frame being non-intra encoded by said encoding (a), said still frame being determined prior to said encoding (a) and comprising a frame with certain content identical and unvarying to certain content of a preceding frame, wherein when said frame is being non-intra encoded said adapting including adjusting said at least one controllable parameter employed in encoding said still frame to disable motion estimation and limit motion compensation to minimize after decoding thereof, visually perceptible pulsation artifacts between still frames of a sequence of still frames within said sequence of video frames, wherein said still frame comprises one still frame of said sequence of still frames.

2. The method of claim 1, further comprising determining whether said frame comprises said still frame.

3. The method of claim 2, wherein each frame of the sequence of video frames comprises a plurality of pixels, and wherein each pixel of each frame comprises a multi-bit value and said determining comprises:
   determining for a current frame (k+1) of the sequence of frames a summation statistic (PIX-SUM$_{k+1}$) derived from said multi-bit values of the plurality of pixels of the current frame;
   determining a summation statistic (PIX-SUM$_k$) derived from the multi-bit values of the plurality of pixels of a prior frame (k) preceding the current frame (k+1) in the sequence of video frames; and
determining whether:

$$|PIX\text{-}SUM_k - PIX\text{-}SUM_{k+1}| < X$$

where X is a predefined value representative of a still frame.

4. The method of claim 3, wherein said determining further comprises:
   determining an accumulated absolute difference derived from adjacent pixels of said plurality of pixels of the current frame ($PIX\text{-}DIFF_{k+1}$);
   determining an accumulated absolute difference derived from adjacent pixels of said prior frame ($PIX\text{-}DIFF_k$); and
   determining whether:

$$|PIX\text{-}DIFF_k - PIX\text{-}DIFF_{k-1}| < Y$$

wherein Y is a predefined value, and wherein said current frame is determined to comprise said still frame if both $|PIX\text{-}SUM_k - PIX\text{-}SUM_{k+1}| < X$ and $|PIX\text{-}DIFF_k - PIX\text{-}DIFF_{k+1}| < Y$ are true.

5. The method of claim 4, wherein said determining further comprises dividing the current frame and the prior frame into z corresponding regions, and wherein said determining comprises determining whether for each of said z corresponding regions:

$$|PIX\text{-}SUM_{kz} - PIX\text{-}SUM_{(k+1)z}| < X.$$

6. The method of claim 5, wherein X=256, Y=256, and z≧4, and wherein said four corresponding regions of said current frame and said prior frame comprise four horizontal bands.

7. The method of claim 2, further comprising determining whether said frame comprises a reference (I) still frame for said sequence of still frames and if so increasing a target bitrate to be used by said encoding (a) to encode said reference still frame.

8. The method of claim 7, wherein said increasing of the target bitrate for said reference still frame comprises detecting a subsequent B or P still frame in said sequence of still frames and moving target bits from said subsequent B or P still frame to said reference still frame.

9. The method of claim 8, wherein said moving of target bits comprises moving fifty percent of target bits for encoding said subsequent B or P still frame to encoding of said reference still frame.

10. The method of claim 2, wherein each frame comprises a plurality of macroblocks, and said method further comprises setting a zero motion vector mode ON upon determining that said frame comprises a still frame, and determining a predictive error for each macroblock of said still frame, and when said predictive error is less than a predetermined value, setting said predictive error to zero making said macroblock a skip macroblock.

11. The method of claim 10, further comprising calculating a quantization level (QL) for said skip macroblock for use in encoding said macroblock, and comparing the calculated quantization level (QL) to an average quantization level of a reference still frame (Av $QL_{ref}$) of said sequence of still frames and replacing said calculated quantization level with said average quantization level of said reference still frame when said calculated quantization level is less than said average quantization level of said reference still frame.

12. The method of claim 1, wherein when said frame comprises a still frame, said adapting (b) comprises defining a plurality of macroblocks in said still frame as skip macroblocks, and maintaining a minimum quantization level for encoding (a) of each skip macroblock of said still frame.

13. The method of claim 12, wherein said adapting (b) comprises maintaining said minimum quantization level for each skip macroblock of said still frame to be an average quantization level of a reference still frame (Av $QL_{ref}$) for said sequence of still frames.

14. The method of claim 2, wherein said frame comprises a plurality of macroblocks, and wherein said determining comprises determining whether said frame comprises a motion frame, and when so, said method further comprises for each of at least some macroblocks of said motion frame:
   (i) determining whether said macroblock comprises a still macroblock;
   (ii) encoding said macroblock employing at least one controllable parameter; and
   (iii) adapting said encoding of said macroblock when said determining (i) determines said macroblock to be said still macroblock, said adapting including adjusting said at least one controllable parameter employed in encoding said still macroblock to minimize after decoding thereof, visually perceptible pulsation artifacts between corresponding still macroblocks of adjacent frames in said sequence of video frames.

15. The method of claim 14, wherein said adapting of said encoding comprises confirming that said still macroblock is other than an edge macroblock and is a non-intra macroblock, and that said frame comprises a P frame, and when confirmed, said method further comprises: determining that a motion vector for said still macroblock is zero and a macroblock difference (MBD) value is less than a predefined value, and when true, encoding said still macroblock as a skip macroblock and assigning a minimum quantization level to said skip macroblock.

16. The method of claim 15, wherein said assigning of the minimum quantization level comprises assigning an average quantization level for a reference frame for said P frame as quantization level for said skip macroblock.

17. The method of claim 14, wherein said adapting of said encoding comprising confirming that said still macroblock is other than an edge macroblock and is a non-intra macroblock, and that said frame comprises a B frame, and when confirmed, said method further comprises: determining that a motion vector for said still macroblock is equal to a motion vector of a previous macroblock in the B frame and that a macroblock difference (MBD) value is less than a predefined value, and if so, then encoding said still macroblock as a skip macroblock and assigning a minimum quantization level to said skip macroblock.

18. The method of claim 17, wherein said assigning of the minimum quantization level comprises assigning an average quantization level for a reference frame for said B frame as quantization level for said skip macroblock.

19. A method for encoding a frame of a sequence of video frames, said frame having a plurality of macroblocks, said method comprising for each of at least some macroblocks of said plurality of macroblocks:
   (a) encoding said macroblock employing at least one controllable parameter; and
   (b) adapting said encoding of said macroblock when said macroblock is a still macroblock being non-intra encoded by said encoding (a), said still macroblock being determined prior to said encoding (a) and comprising a macroblock with certain content identical and unvarying to certain content of a corresponding macroblock in a preceding frame, wherein when said macroblock is being non-intra encoded said adapting including adjusting said at least one controllable parameter employed in encoding said still macroblock to disable motion estimation and limit motion compensation to minimize after decoding thereof, visually perceptible pulsation artifacts between corresponding still macroblocks of adjacent frames in said sequence of video frames.

20. The method of claim 19, further comprising determining whether said macroblock comprises said still macroblock.

21. The method of claim 19, wherein said adapting of said encoding comprises encoding said still macroblock as a skip macroblock and assigning a minimum quantization level to said skip macroblock.

22. The method of claim 20, wherein said assigning of the minimum quantization level comprises assigning an average quantization level of a reference frame to said frame as said minimum quantization level for said still macroblock.

23. A system for encoding a sequence of video frames comprising:
 a pre-encode processing unit, said pre-encode processing unit comprising:
  a statistics measurement unit for use in determining prior to encoding whether a current frame of the sequence of frames comprises a still frame, said still frame comprising a frame with certain content identical and unvarying to certain content of a preceding frame;
  a control unit for modifying at least one controllable parameter employed in non-intra encoding said still frame to disable motion estimation and limit motion compensation when said still frame is being non-intra encoded to minimize after decoding thereof, visually perceptible pulsation artifacts between still frames of a sequence of still frames when said statistics measurement unit determines said current frame to comprise said still frame; and
 an encoding engine for non-intra encoding said current frame of the sequence of video frames using the at least one controllable encode parameter set by said pre-encode processing unit.

24. The system of claim 23, wherein said statistics measurement unit comprises means for determining whether said current frame comprises a reference still frame, and if so, said control unit comprises means for increasing a target bitrate used by the encoding engine to encode said reference still frame.

25. The system of claim 24, wherein said means for increasing said target bitrate comprises means for transferring target bits from a subsequent still frame in a sequence of still frames to said reference still frame, said reference still frame also being in said sequence of still frames.

26. The system of claim 23, wherein each frame of said sequence of video frames comprises a plurality of macroblocks, and wherein said control unit of said pre-encode processing unit further comprises means for setting zero motion vector mode ON upon determining that said frame comprises a still frame, and means for determining a predictive error for each macroblock of said still frame, and for each macroblock of said still frame for setting its predictive error to zero making said macroblock a skip macroblock when its determined predictive error is less than a predetermined value representative of a still macroblock.

27. The system of claim 26, wherein said control unit further comprises means for maintaining a minimum quantization level for encoding each skip macroblock of said still frame.

28. The system of claim 27, wherein said means for maintaining comprises means for maintaining said minimum quantization level for each skip macroblock of said still frame at an average quantization level of a reference still frame (Av $QL_{ref}$) for said sequence of still frames.

29. The system of claim 23, wherein each frame of the sequence of video frames comprises a plurality of pixels, and wherein each pixel of each frame comprises a multi-bit value, and said statistics measurement unit comprises means for:
 determining for a current frame (k+1) of the sequence of frames a summation statistic ($PIX\text{-}SUM_{k+1}$) derived from said multi-bit values of the plurality of pixels of the current frame;
 determining a summation statistic ($PIX\text{-}SUM_k$) derived from the multi-bit values of the plurality of pixels of a prior frame (k) preceding the current frame (k+1) in the sequence of video frames; and
 determining whether:

$$|PIX\text{-}SUM_k - PIX\text{-}SUM_{k+1}| < X$$

where X is a predefined value representative of a still frame.

30. The system of claim 29, wherein said control unit further includes means for:
 determining an accumulated absolute difference derived from adjacent pixels of said plurality of pixels of the current frame ($PIX\text{-}DIFF_{k+1}$);
 determining an accumulated absolute difference derived from adjacent pixels of said prior frame ($PIX\text{-}DIFF_k$); and
 determining whether:

$$|PIX\text{-}DIFF_k - PIX\text{-}DIFF_{k+1}| < Y$$

wherein Y is a predefined value, and wherein said current frame is determined to comprise said still frame if both $|PIX\text{-}SUM_k - PIX\text{-}SUM_{k+1}| < X$ and $|PIX\text{-}DIFF_k - PIX\text{-}DIFF_{k+1}| < Y$ are true.

31. The system of claim 23, wherein when said current frame comprises other than said still frame, said control unit further comprises means for adapting encoding each of at least one macroblock of said current frame when said macroblock comprises a still macroblock, said means for adapting including means for adjusting said at least one controllable parameter employed in encoding said still macroblock to minimize after decoding thereof, visually perceptible pulsation artifacts between corresponding still macroblocks of adjacent frames in said sequence of video frames.

32. The system of claim 31, wherein said means for adapting comprises means for confirming that said still macroblock is other than an edge macroblock and is a non-intra macroblock, and that said frame comprises a P frame, and wherein said control unit further includes means for determining that a motion vector for said still macroblock is zero and a macroblock difference (MBD) value is less than a predefined value, and when true, said encoding engine further comprises means for encoding said still macroblock as a skip macroblock having a minimum quantization level defined by a quantization level of a reference frame for said P frame.

33. The system of claim 31, wherein said means for adapting comprises means for confirming that said still macroblock is other than an edge macroblock and is a non-intra macroblock, and that said frame comprises a B frame, and wherein said control unit further comprises means for determining that a motion vector for said still macroblock is equal to a motion vector of a previous macroblock in the B frame and that a macroblock difference (MBD) value is less than a predefined value, and when true, said encoding engine further comprises means for encoding said still macroblock as a skip macroblock having a minimum quantization level to said skip macroblock, defined by a quantization level of a reference frame for said B frame.

34. A system for encoding a macroblock of a plurality of macroblocks of a frame in a sequence of video frames, said system comprising:
    an encoding engine for encoding said macroblock of said frame using at least one controllable encode parameter; and
    means for adapting said encoding of said macroblock when said macroblock is a still macroblock being non-intra encoded by said encoding engine, said still macroblock being determined prior to receipt of the still macroblock at the encoding engine, and comprising a macroblock with certain content identical and unvarying to certain content of a corresponding macroblock in a preceding frame, wherein when said macroblock is being non-intra encoded said adapting including means for adjusting said at least one controllable parameter employed in encoding said still macroblock to disable motion estimation and limit motion compensation to minimize after decoding thereof, visually perceptible pulsation artifacts between corresponding still macroblocks of adjacent frames in said sequence of video frames.

35. The system of claim 34, further comprising means for determining whether said macroblock comprises said still macroblock.

36. The system of claim 35, wherein said means for adapting of said encoding comprises means for adjusting encoding of said still macroblock to encode said still macroblock as a skip macroblock and to encode said skip macroblock with a minimum quantization level defined by a quantization level of a reference frame to said frame having said still macroblock.

37. A computer program product comprising a computer usable medium having computer readable program code means therein for use in encoding a sequence of video frames, said computer readable program code means in said computer program product comprising for each frame of the sequence of video frames:
    computer readable program code means for causing a computer to affect determining, prior to encoding, whether said frame comprises a still frame, said still frame comprising a frame with certain content identical and unvarying to certain content of a preceding frame;
    computer readable program code means for causing a computer to affect non-intra encoding said frame employing at least one controllable encode parameter; and
    computer readable program code means for causing a computer to affect adapting said encoding of said frame when said determining determines said frame to be used still frame being non-intra encoded, wherein when said frame is being non-intra encoded said adapting including adjusting said at least one controllable parameter employed in encoding said still frame to disable motion estimation and limit motion compensation to minimize after decoding thereof, visually perceptible pulsation artifacts between still frames of a sequence of still frames within said sequence of video frames, wherein said still frame comprises one still frame of said sequence of still frames.

38. The computer readable program code means of claim 37, wherein said computer readable program code means for causing a computer to affect determining comprises computer readable program code means for causing a computer to affect determining whether said frame comprises a reference (I) still frame for said sequence of still frames, and when so, said computer readable program code means for causing a computer to affect adapting comprises computer readable program code means for causing a computer to affect increasing a target bitrate to be used by said encoding to encode said reference still frame by moving target bits from at least one subsequent still frame of said sequence of still frames to said reference still frame.

39. The computer readable program code means of claim 38, wherein each frame of said sequence of video frames comprises a plurality of macroblocks, and wherein said computer readable program code means for causing a computer to affect adapting comprises computer readable program code means for causing a computer to affect setting a zero motion vector mode ON upon determining that said frame comprises said still frame, and for determining a predictive error for each macroblock of said still frame, and when said predictive error is less than a predetermined value, for setting said predictive error to zero making said macroblock a skip macroblock.

40. The computer readable program code means of claim 39, wherein said computer readable program code means for causing a computer to affect adapting comprises computer readable program code means for causing a computer to affect maintaining a minimum quantization level for encoding each skip macroblock of said still frame, wherein said minimum quantization level comprises an average quantization level of a reference still frame for said sequence of still frames.

41. The computer readable program code means of claim 37, wherein said frame comprises a plurality of macroblocks, and wherein said computer readable program code means for causing a computer to affect determining comprises computer readable program code means for causing a computer to affect determining whether said frame comprises a motion frame, and when so, said computer readable program code means further comprises for each of at least some macroblocks of said motion frame:
    computer readable program code means for causing a computer to affect determining whether said macroblock comprises a still macroblock;
    computer readable program code means for causing a computer to affect encoding said macroblock employing at least one controllable parameter; and
    computer readable program code means for causing a computer to affect adapting said encoding of said macroblock when said macroblock comprises said still macroblock, said adapting including adjusting said at least one controllable parameter employed in encoding said still macroblock to minimize after decoding thereof, visually perceptible pulsation artifacts between corresponding still macroblocks of adjacent frames in said sequence of video frames.

* * * * *